US011310028B2

(12) United States Patent
Hars

(10) Patent No.: US 11,310,028 B2
(45) Date of Patent: Apr. 19, 2022

(54) TAMPER RESISTANT COUNTERS

(71) Applicant: THE BOEING COMPANY, Chicago, IL (US)

(72) Inventor: Laszlo Hars, Lafayette, CO (US)

(73) Assignee: THE BOEING COMPANY, Chicago, IL (US)

( * ) Notice: Subject to any disclaimer, the term of this patent is extended or adjusted under 35 U.S.C. 154(b) by 246 days.

(21) Appl. No.: 16/264,416

(22) Filed: Jan. 31, 2019

(65) Prior Publication Data

US 2020/0252196 A1    Aug. 6, 2020

(51) Int. Cl.
| | |
|---|---|
| G06F 21/00 | (2013.01) |
| H04L 29/06 | (2006.01) |
| H04L 9/00 | (2022.01) |
| G06F 21/44 | (2013.01) |
| G06F 21/71 | (2013.01) |
| H04L 9/08 | (2006.01) |

(52) U.S. Cl.
CPC .............. *H04L 9/002* (2013.01); *G06F 21/44* (2013.01); *G06F 21/71* (2013.01); *H04L 9/0869* (2013.01)

(58) Field of Classification Search
CPC ....... H04L 9/002; H04L 9/0869; G06F 21/44; G06F 21/71
See application file for complete search history.

(56) References Cited

U.S. PATENT DOCUMENTS

| | | | | |
|---|---|---|---|---|
| 4,740,835 | A | * | 4/1988 | Nishibori ............... H04N 7/162 340/9.1 |
| 8,583,711 | B2 | | 11/2013 | Hars |
| 8,583,712 | B2 | | 11/2013 | Hars |
| 9,396,136 | B2 | | 7/2016 | Hars et al. |
| 9,785,409 | B1 | | 10/2017 | Matthews, Jr. et al. |
| 2008/0212367 | A1 | * | 9/2008 | Kim ..................... G11C 11/5628 365/185.03 |
| 2013/0117577 | A1 | | 5/2013 | Hars et al. |
| 2016/0026783 | A1 | | 1/2016 | Buer et al. |

(Continued)

FOREIGN PATENT DOCUMENTS

WO    2017196461 A1    11/2017

OTHER PUBLICATIONS

Extended European Search Report dated Jun. 25, 2020 issued in corresponding EP Application No. 20154465.7, pp. 1-11.

*Primary Examiner* — Jeffrey C Pwu
*Assistant Examiner* — Rodman Alexander Mahmoudi
(74) *Attorney, Agent, or Firm* — Moore Intellectual Property Law, PLLC

(57) ABSTRACT

A method of persistently storing event counts includes generating, using a secret cryptographic key, a sequence of numbers arranged in a pseudorandom order. The sequence of numbers is indicative of a sequence of addresses of cells in an array of cells. Each cell in the array of cells is programmable from an initial state to a programmed state to persistently encode data indicative of counter values associated with a particular event. The method also includes comparing addresses of cells having the programmed state with the sequence of addresses to determine whether a tampering event occurred at the array of cells. The method further includes, based on the determination, authenticating the array of cells or performing a countermeasure.

20 Claims, 9 Drawing Sheets

(56) References Cited

U.S. PATENT DOCUMENTS

| | | | |
|---|---|---|---|
| 2016/0173278 A1* | 6/2016 | Pedersen | H04L 9/0822 |
| | | | 380/255 |
| 2017/0163416 A1 | 6/2017 | Hars | |
| 2018/0284735 A1* | 10/2018 | Celia | G05B 23/0264 |
| 2019/0147967 A1* | 5/2019 | Tuyls | H04L 9/3239 |
| | | | 365/96 |

* cited by examiner

TAMPER RESISTANT COUNTERS

FIELD OF THE DISCLOSURE

The present disclosure is related to one-time programmable memory cell counters.

BACKGROUND

In a security device, certain events have to be counted and the counter value has to be preserved over numerous power cycles. For example, in a flight application, the number of times a flight computer is powered on is counted and the counter value is preserved over numerous cycles. Sensitive information or data can be encrypted based on the counter value and stored at a flight computer in a storage device, which may be accessible to an attacker (e.g. a disk drive). To preserve the counter value over prolonged or unanticipated power down events, the security device can implement a counter using one-time programmable memory cells, which are embedded in the security device, and thereby cannot be illicitly replaced. For example, each time the flight computer is powered on, the security device can change the state of particular one-time programmable memory cells from an initial state to a programmed state to increase a counter value associated with a power-on cycle. However, certain physical attacks can reset or destroy targeted one-time programmable memory cells. As a result, an attacker can recreate an earlier counter value to access (or replay) content at the flight computer associated with the earlier counter value.

SUMMARY

According to one implementation of the present disclosure, a device for persistently storing event counts includes an array of cells. Each cell in the array of cells is configured to be programmed from an initial state to a programmed state to persistently encode data indicative of counter values associated with a particular event. The programmed state cannot be reversed back to the initial state in normal operation (accordingly, they are called One Time Programmable or OTP cells). The device also includes a sequence generator configured to generate, using a secret cryptographic key, a sequence of numbers arranged in a pseudorandom order. The sequence of numbers is indicative of a sequence of addresses of cells in the array of cells. The device also includes an event counter module configured to compare addresses of cells having the programmed state with the sequence of addresses to determine whether a tampering event occurred at the array of cells. The event counter module is also configured to, based on the determination, authenticate the array of cells or perform a countermeasure.

According to another implementation of the present disclosure, a method of persistently storing event counts includes generating, using a secret cryptographic key, a sequence of numbers arranged in a pseudorandom order. The sequence of numbers is indicative of a sequence of addresses of cells in an array of cells. Each cell in the array of cells is programmable from an initial state to a programmed state to persistently encode data indicative of counter values associated with a particular event. The method also includes comparing addresses of cells having the programmed state with the sequence of addresses to determine whether a tampering event occurred at the array of cells. The method further includes, based on the determination, authenticating the array of cells or performing a countermeasure.

According to another implementation of the present disclosure, a device for persistently storing event counts includes an array of cells. Each cell in the array of cells is configured to be programmed from an initial state to a programmed state to persistently encode data indicative of counter values associated with a particular event. The device also includes means for generating, using a secret cryptographic key, a sequence of numbers arranged in a pseudorandom order. The sequence of numbers is indicative of a sequence of addresses of cells in the array of cells. The device also includes means for comparing addresses of cells having the programmed state with the sequence of addresses to determine whether a tampering event occurred at the array of cells. The device also includes means for authenticating the array of cells based on the determination and means for performing a countermeasure based on the determination.

One advantage of the above-described implementation is improved security for a device that uses one-time programmable memory cells to count events by reducing the likelihood that an array of cells (e.g., the one-time programmable memory cells) is subject to a successful reset attack. For example, instead of programming the cells in sequential order to indicate an increase in counter value, the cells are programmed in a pseudo-random order that is determined based on the secret cryptographic key. Thus, an attacker attempting to reset the array of cells to access data associated with a previous counter value must know the pseudo-random order of the sequence of numbers and know the relationship between each number in the sequence of numbers and the addresses of the cells. As an added layer of security, in some implementations, each counter value is associated with a pseudorandom number of cells that is also determined by a secret cryptographic key. The device includes a second sequence generator configured to generate, using a secret cryptographic key, a second sequence of numbers. The numbers in the second sequence of numbers are indicative of the number of cells in the array of cells, which are programmed together to indicate the counter value following the previous counter value. Additionally, the features, functions, and advantages that have been described can be achieved independently in various implementations or may be combined in yet other implementations, further details of which are disclosed with reference to the following description and drawings.

DETAILED DESCRIPTION

Figure 1:
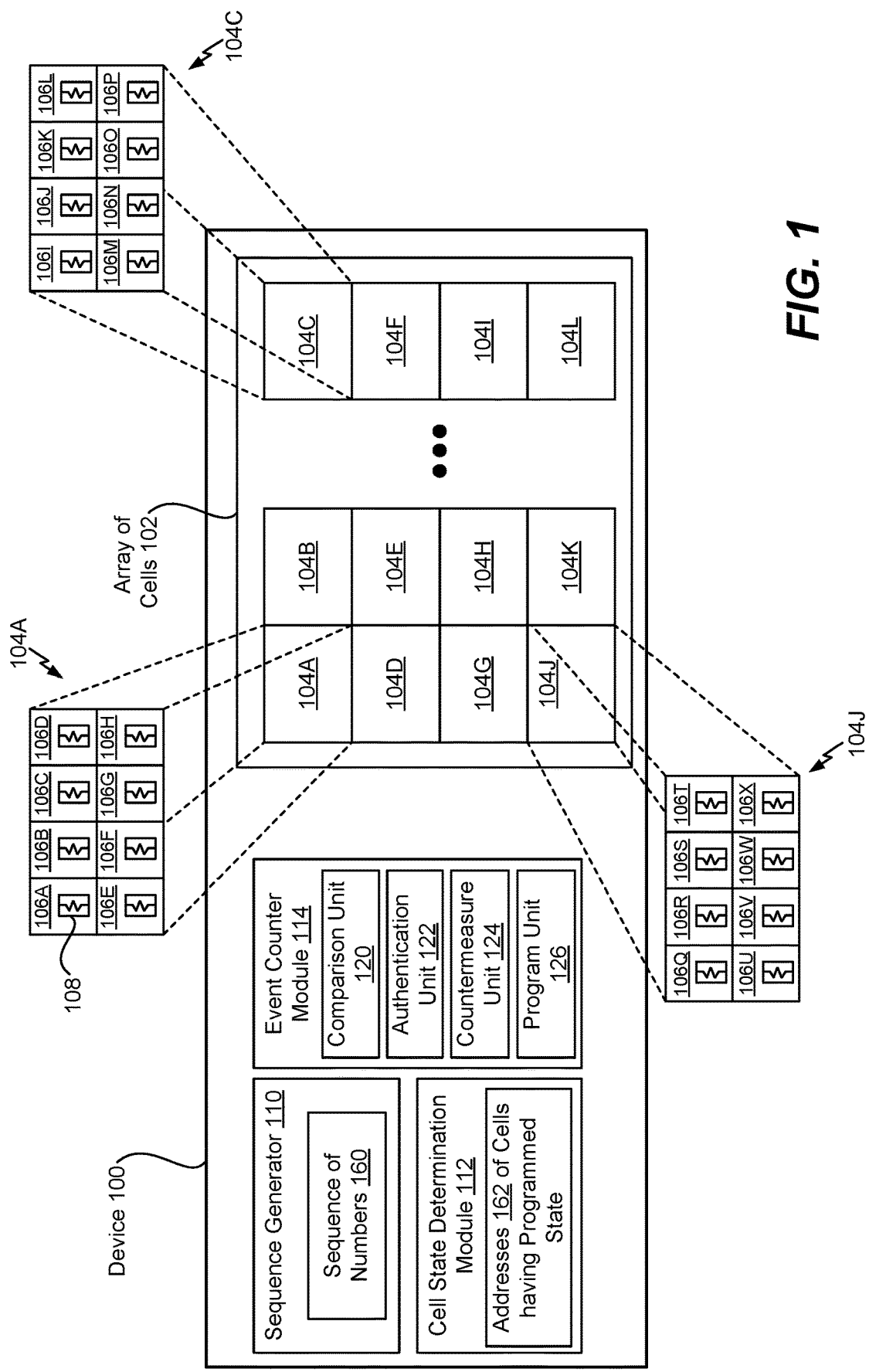
FIG. 1 is a diagram of a device that is operable to persistently store event counts for a particular event using one-time programmable memory cells.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple cells are illustrated and associated with reference numbers 106A, 106B, 106C, etc. When referring to a particular one of these cells, such as the cell 106A, the distinguishing letter "A" is used. However, when referring to any arbitrary one of these cells or to these load cells as a group, the reference number 106 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

The techniques described herein enable improved security for a device with a counter that uses one-time programmable memory cells to count events by reducing the likelihood that an array of cells (e.g., the one-time programmable memory cells) is subject to a successful external cell-reset attack. For example, a security device generates a sequence of pseudo-random numbers using a secret cryptographic key. Each number in the sequence of pseudorandom numbers corresponds to an address of a one-time programmable memory cell usable to indicate a counter value associated with an event. Upon occurrence of an event (e.g., a power-on event), the security device programs one-time programmable cells in the order according to the pseudorandom sequence of numbers instead of programming the one-time programmable memory cells in sequential order. As a result, each time the event occurs, to increase the counter value, for an observer random looking bits (e.g., cells) associated with one-time programmable memory cells are programmed from an initial state indicative of a logical zero value to a programmed state indicative of a logical one value, or vice versa. Thus, the bit pattern of the one-time programmable memory cells seemingly randomly changes, that is in a pseudorandom order (as opposed to sequentially changes) each time the counter value increases. An attacker sometimes can, with expensive, large, sophisticated equipment reset some of the one-time programmable cells; however, the security device can detect such an external cell-reset attack if an invalid bit pattern is detected. Upon detecting an external cell-reset attack, the security device performs damage control, e.g. it can abort a power-up sequence (e.g., a boot sequence), send an alarm to a user, erase sensitive data, etc. Because pseudorandom bits are programmed each time the event occurs to increase the counter value, an attacker will not know which bit patterns are valid. As a result, attempts to reset some one-time programmable memory cells to replay an earlier counter value likely will result in an invalid bit pattern. Even if an attacker is able to observe earlier counter values, the associated programmed cells are dispersed among all the cells, and resetting such patterns of cells is extremely difficult. For example, the size of a cell is around 10 nm in modern ASIC manufacturing techniques; however, the wave length of a cell destroying laser wave is orders of magnitude larger.

FIG. 1 is a diagram of a device 100 that is operable to persistently store event counts for a particular event using one-time programmable memory cells. For example, each time the particular event occurs, the device 100 is operable to update a counter value by changing a state of one or more one-time programmable memory cells to indicate that the particular event occurred. According to one implementation, the particular event is associated with at least one of powering on a flight computer or booting the flight computer. For example, the device 100 can be integrated into an aircraft flight computer and can count the number of times the aircraft flight computer is powered on. According to another implementation, the particular event is associated with an automotive security system. For example, the device 100 can be integrated into the automotive security system and can count the number of times an event (e.g., an automobile power-up event) occurs.

The device 100 includes an array of cells 102, a sequence generator 110, a cell state determination module 112, and an event counter module 114. According to one implementation, the array of cells 102, the sequence generator 110, the cell state determination module 112, and the event counter module 114 are integrated onto a die. The cell state determination module 112 can be implemented using hardware, software, firmware, instructions that are executed by a processor, etc. In a similar manner, the event counter module 114 can be implemented using hardware, software, firmware, instructions that are executed by a processor, etc. According to one implementation, the cell state determination module 112 is integrated into the event counter module 114.

The array of cells 102 includes a plurality of sections 104 (e.g., sub-arrays). As illustrated in FIG. 1, the array of cells includes a section 104A, a section 104B, a section 104 C, a section 104D, a section 104E, a section 104F, a section 104G, a section 104H, a section 104I, a section 104J, a section 104K, and a section 104L. Although twelve sections 104 are illustrated in FIG. 1, in other implementations, additional (or fewer) sections are included in the array of cells 102. As a non-limiting example, the array of cells 102 can include forty-eight sections. As another non-limiting example, the array of cells 102 can include two sections or a single section.

Each section 104 in the array of cells 102 includes a plurality of cells 106. For example, in FIG. 1, the section 104A includes a cell 106A, a cell 106B, a cell 106C, a cell 106D, a cell 106E, a cell 106F, a cell 106G, and a cell 106H. The section 104C includes a cell 106I, a cell 106J, a cell 106K, a cell 106L, a cell 106M, a cell 106N, a cell 106O, and a cell 106P. The section 104J includes a cell 106Q, a cell 106R, a cell 106S, a cell 106T, a cell 106U, a cell 106V, a cell 106 W, and a cell 106X. Although, for ease of illustration, the cells 106 in three sections 104A, 104C, 104J are depicted in FIG. 1, the remaining sections 104 may have a similar architecture as the sections 104A, 104C, 104J.

Each cell 106 in the array of cells 102 has a unique address (e.g., a unique memory address). As explained below, each address is mapped to a unique number in a sequence of numbers 160 generated by the sequence generator 110. Each cell 106 includes a programmable element 108 that can be programmed from an initial state to a programmed state. For example, each cell 106 can correspond to a one-time programmable memory cell that includes a fuse element or an anti-fuse element, which may be implemented in conjunction with a transistor (e.g., the programmable element 108). If the programmable element 108 for a particular cell 106 is in the initial state, a bit reading for the particular cell 106 has a value of "1." In an example, if the programmable element 108 for a particular cell 106 is programmed to the programmed state, a bit reading for the particular cell 106 has a value of "0."

The sequence generator 110 is configured to generate the sequence of numbers 160 using a secret cryptographic key. For example, referring to FIG. 2, a secret cryptographic key 202 is provided to the sequence generator 110 to generate the sequence of numbers 160 that are arranged in a pseudorandom order. For example, the sequence generator 110 may include a linear-feedback shift register (LFSR), a nonlinear-feedback shift register (NLFSR), another pseudorandom number generator (PRNG), or a combination thereof. In the illustrative example of FIG. 2, the sequence of numbers 160 is "14, 8, 1, 19, 25, 13, 83, 51, 673, 1003, 12, 85, 43, 1215, 1138, . . . , 245." For ease of illustration, each number in the sequence of numbers 160 is a decimal number; however, it should be understood the sequence of numbers 160 can include binary numbers, hexadecimal numbers, etc.

The secret cryptographic key 202 is unique among application-specific integrated circuits (ASICs) at a relatively high probability and therefore unpredictable. The secret cryptographic key 202 can be generated by physical circuit parameters. According to one implementation, the secret cryptographic key 202 can include device-specific information, such as a serial number of a corresponding ASIC. Thus, the sequence of numbers 160 is different for each device (e.g., chip); however, the sequence of numbers 160 is the same for each evaluation (or generation) at a single device, such as the device 100. According to one implementation, a Fisher-Yates-type shuffle technique can be used to generate the pseudorandom sequence of numbers 160.

The sequence of numbers 160 is a permutation of the indices of the cells 106, which typically have indices that are consecutive numbers, such as 0, 1, 2, . . . , N−1, when there are N cells. For example, the sequence of numbers 160 is indicative of a sequence of addresses of the cells 106 in the array of cells 102. To illustrate, the address of the cell 106C corresponds to the number "14" in the sequence of numbers 160, the address of the cell 106T corresponds to the number "8" in the sequence of numbers 160, the address of the cell 106Q corresponds to the number "1" in the sequence of numbers 160, etc. Each bit (e.g., number) in the sequence of numbers 160 is used once. As described below, some bits (e.g., numbers) in the sequence of numbers 160 can be used to determine the number ($i_k$) of cells 106 to be programmed when incrementing the counter. For example, the number ($i_k$) can be equal to one, two, three, or four in some implementations.

An indication of a first counter value 210 for the particular event is present when the cells 106C, 106T, 106Q have the programmed state. An indication of a second counter value 220 for the particular event is present when the cells 106I, 106X have the programmed state in addition to the cells 106C, 106T, 106Q associated with the first counter value 210 and the remaining cells 106 have the initial state. An indication of a third counter value 230 for the particular event is present when the cells 106A, 106L have the programmed state in addition to the cells 106C, 106T, 106Q, 106I, 106X associated with the second counter value 220, and the remaining cells 106 have the initial state. According to one implementation, the number of cells 106 that correspond to each counter value is based on the secret cryptographic key 202, such as encoded within the sequence of numbers 160 (e.g., a sequence of numbers within the sequence of numbers 160 indicates the number of cells for each counter value).

Referring back to FIG. 1, the cell state determination module 112 is configured to determine the addresses 162 of the cells 106 having the programmed state. For example, the cell state determination module 112 can initiate a read operation to read the bit values for each cell 106 in the array of cells 102. If a particular cell 106 has a bit value of "0" (e.g., indicating a relatively high resistive state), the cell state determination module 112 determines that the particular cell 106 has the initial state. However, if the particular cell 106 has a bit value of "1" (e.g., indicating a relatively low resistive state), the cell state determination module 112 determines that the particular cell 106 has the programmed state.

Figure 2:
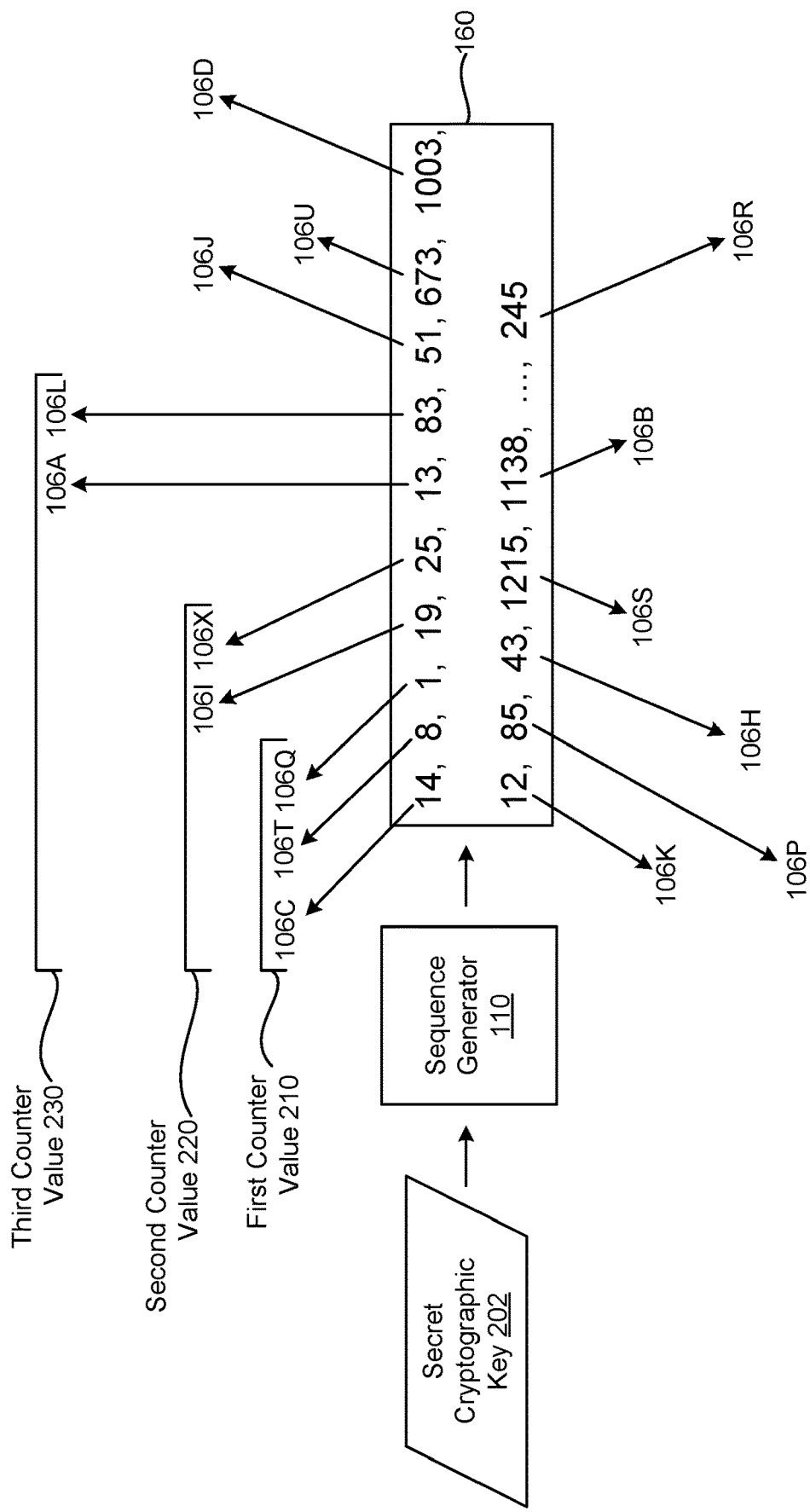
FIG. 2 is a diagram of a sequence generator that is operable to generate a sequence of pseudorandom numbers based on a secret cryptographic key.

The event counter module 114 includes a comparison unit 120, an authentication unit 122, a countermeasure unit 124, and a program unit 126. The comparison unit 120 is configured to compare the addresses 162 of the cells 106 having the programmed state with the sequence of addresses (e.g., the sequence of numbers 160) to determine whether a tampering event occurred at the array of cells 102. For example, as illustrated in FIG. 2, each counter value 210, 220, 230 is represented by a certain set of programmed cells 106. Sets of programmed cells 106 corresponding to lower counter values are subsets of later sets of programmed cells 106 corresponding to higher counter values. For example, a first set of programmed cells 106C, 106T, 106Q corresponding to the first counter value 210 is a subset of a second set of programmed cells 106C, 106T, 106Q, 106I, 106X corresponding to the second counter value 220. The event counter module 114 determines whether the tampering event occurred by verifying that the observed set of programmed cells 106 (e.g., the addresses 162 of the cells 106 having the programmed state) correspond to a valid counter value. If the addresses 162 of the cells 106 having the programmed state correspond to valid counter value, the event counter module 114 determines that the tampering event did not occur. Illustrations of valid counter values are depicted and described with respect to FIGS. 3-4. However, if the addresses 162 of the cells having the programmed state fail to correspond to a valid counter value, the event counter module 114 determines that the tampering event occurred. An illustration of an invalid counter value is depicted and described with respect to FIG. 5.

According to one implementation, the event counter module 114 is configured to determine that the tampering event occurred in response to a determination that a first particular cell 106 corresponding to a first particular number in the sequence of numbers 160 is in the initial state and a second particular cell 106 corresponding to a second particular number in the sequence of numbers 160 is in the programmed state. In this implementation, the second particular number follows the first particular number in the sequence of numbers 160. To illustrate, the event counter module 114 may determine that the tampering event occurred in response to a determination that the cell 106C is in the initial state and the cell 106I is in the programmed state. For example, because the cell 106I corresponds to a number (e.g., "19") in the sequence of numbers 160 that follows the number (e.g., "14") corresponding to the cell 106C, the event counter module 114 can determine that the tampering event occurred because the cell 106I was programmed before the cell 106C.

In response to determining that the tampering event occurred, the countermeasure unit 124 can perform one or more countermeasures. For example, the countermeasure unit 124 can delete data from an external memory, such as the external memory 608 described with respect to FIG. 6. As another non-limiting example, the countermeasure unit 124 can delete data from an internal memory, such as the internal memory 606 described with respect to FIG. 6, in response to a determination that the tampering event occurred. As another non-limiting example, the countermeasure unit 124 can restrict access to one or more operations of a processor, such as the processor 604 described with respect to FIG. 6, in response to a determination that the tampering event occurred.

In response to determining that the tampering event failed to occur, the authentication unit 122 is configured to authenticate the array of cells 102. For example, the authentication unit 122 can generate a signal indicating that no tampering or security attacks on the device 100 have been detected. Based on the signal, the program unit 126 is configured to program a next set of cells 106 in the array of cells 102 corresponding to the next counter value in response to detecting the particular event (e.g., powering up).

For example, in response to detecting the particular event and after a determination that the tampering event failed to occur, the program unit 126 is configured to identify a last particular number in the sequence of numbers 160 that corresponds to a cell 160 in the programmed state. To illustrate, if the first counter value 210 is the current counter value, referring to the sequence of numbers 160, the last particular number that corresponds to a cell 160 in the programmed state is "1." The program unit 126 is also configured to determine the number of cells 106 to be programmed for the next counter value. For example, the program unit 126 may determine that the number of cells 106 to be programmed for the second counter value 220 (e.g., the next counter value) is two. The number of cells 106 to be programmed for the next counter value is pseudo-random and can be encoded into the sequence of numbers 160. According to one implementation, the number of cells 106 to be programmed for the next counter value is between one and four.

The program unit 126 is further configured to identify a set of numbers in the sequence of numbers 160 corresponding to the second counter value 220 (e.g., the next counter value). A size of the set of numbers is equal to the number of cells 106 to be programmed for the next counter value. For example, in the given example, the size of the set of numbers corresponding to the second counter value 220 is two. In a similar manner as the number of cells 106 to be programmed for the next counter value, the size of the set of numbers is pseudo-random and is typically between one and four, but larger numbers are also possible. The size of the set of numbers can be encoded into the sequence of numbers 160 or can be stored (e.g., encoded) into a second sequence of numbers (not shown). In the given example, the program unit 126 identifies the numbers "19" and "25" as the set of numbers corresponding to the second counter value 220. The first number (e.g., "19") in the set of numbers sequentially follows the last particular number (e.g., "1") that corresponds to a cell 106 in the programmed state.

The program unit 126 is further configured to program a set of cells 106 (that corresponds to the set of numbers) in the array of cells 102 from the initial state to the programmed state. For example, the program unit 126 can send a write voltage to program the programmable elements 108 of the cells 106I, 106X to the programmed state. As a result, in some implementations, the voltage levels across the cells 106I, 106X reduces such that the cells 106I, 106X have a bit value equal to zero.

The techniques described with respect to FIGS. 1-2 improve counter security by reducing the likelihood of success of an external reset attack on the array of cells 102. For example, instead of programming the cells 106 in sequential order to indicate an increase in counter value, the cells 106 are programmed in a pseudo-random order that is determined based on the secret cryptographic key 202. Thus, an attacker attempting to reset the array of cells 102 to access data associated with a previous counter value must know the pseudo-random order of the sequence of numbers 160 and know the relationship between each number in the sequence of numbers 160 and the addresses of the cells 106. As an added layer of security, each counter value is associated with a random number of cells 106. For example, three cells 106C, 106T, 106Q are programmed to indicate the first counter value 210, two additional cells 106I, 106X are programmed to indicate the second counter value 220, etc. Thus, an attacker attempting to reset the array of cells 102 to access data associated with a previous counter value must also know how many cells 106 are programmed for a particular counter value, in addition to the pseudo-random location of the programmed cells 106.

As a result of the techniques described with respect to FIGS. 1-2, conventional attacks or techniques for resetting one-time programmable memory cells may be unsuccessful. For example, if the cells 106 are programmed in sequential order, an attacker may be able to target the array of cells 102 with a laser pulse to destroy a group of cells 106 and effectively reset the counter value. However, because heating a die with a focused laser will likely destroy a large number of proximate cells 106 (e.g., destroy different sections 104 at a time), the bit patterns resulting from such an attack will likely indicate an invalid counter value. To illustrate, if a laser is applied to the cell 106B in an attempt to return the cell 106B to the initial state, it is likely that each programmed cell 106A-106H in the section 104A will also be returned to the initial state because of the heat associated with the laser. As a result, the event counter module 114 can indicate that a tampering event (e.g., the applied laser) occurred because the cells 106 having a programmed state do not correspond to a valid counter value, and the countermeasure unit 124 can perform a countermeasure.

Figure 3:
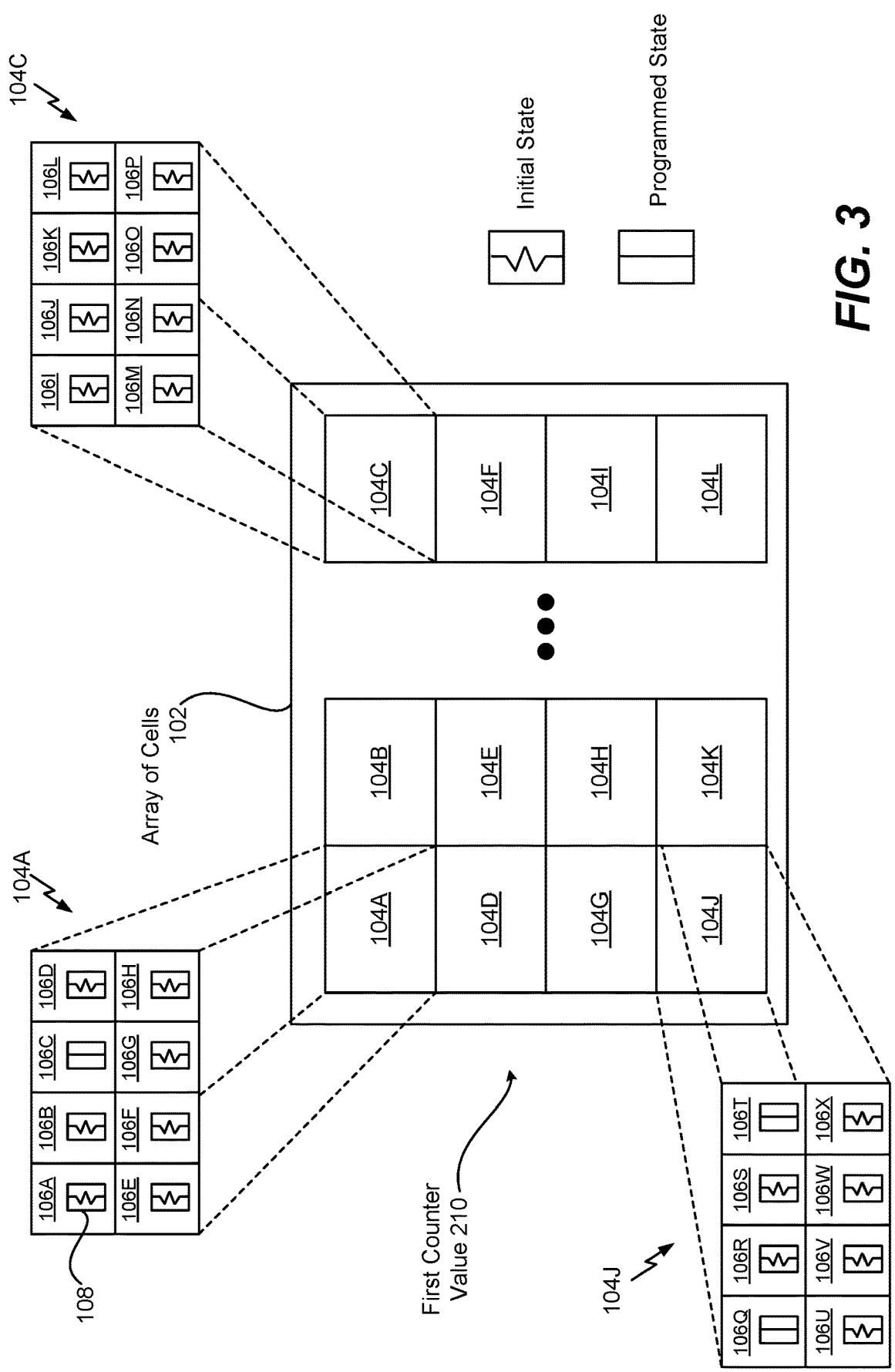
FIG. 3 is a diagram of an array of cells in a programmable state representative of a first valid counter value.

FIG. 3 is a diagram of the array of cells 102 in a programmable state representative of a first valid counter value. For example, in FIG. 3, the cells 106C, 106T, 106Q have the programmed state and the remaining cells 106 have the initial state. Based on the pseudorandom sequence of numbers 160 and the corresponding cell addresses, the programmable state of the array of cells 102 illustrated in FIG. 3 is representative of the first counter value 220. For example, if the cells 106C, 106T, 106Q are the only cells 106 having the programmed state, the event counter module 114 determines that the current counter value is the first counter value 210 and determines that no tampering event has occurred at the array of cells 102.

In response to determining that a tampering event failed to occur, the authentication unit 122 is configured to authenticate the array of cells 102. For example, the authentication unit 122 can generate a signal indicating that there has been no tampering or security attacks on the device 100. Based on the signal, the program unit 126 is configured to program a next set of cells 106 in the array of cells 102 corresponding to the next counter value in response to detecting the particular event, as described with respect to FIG. 4.

Figure 4:
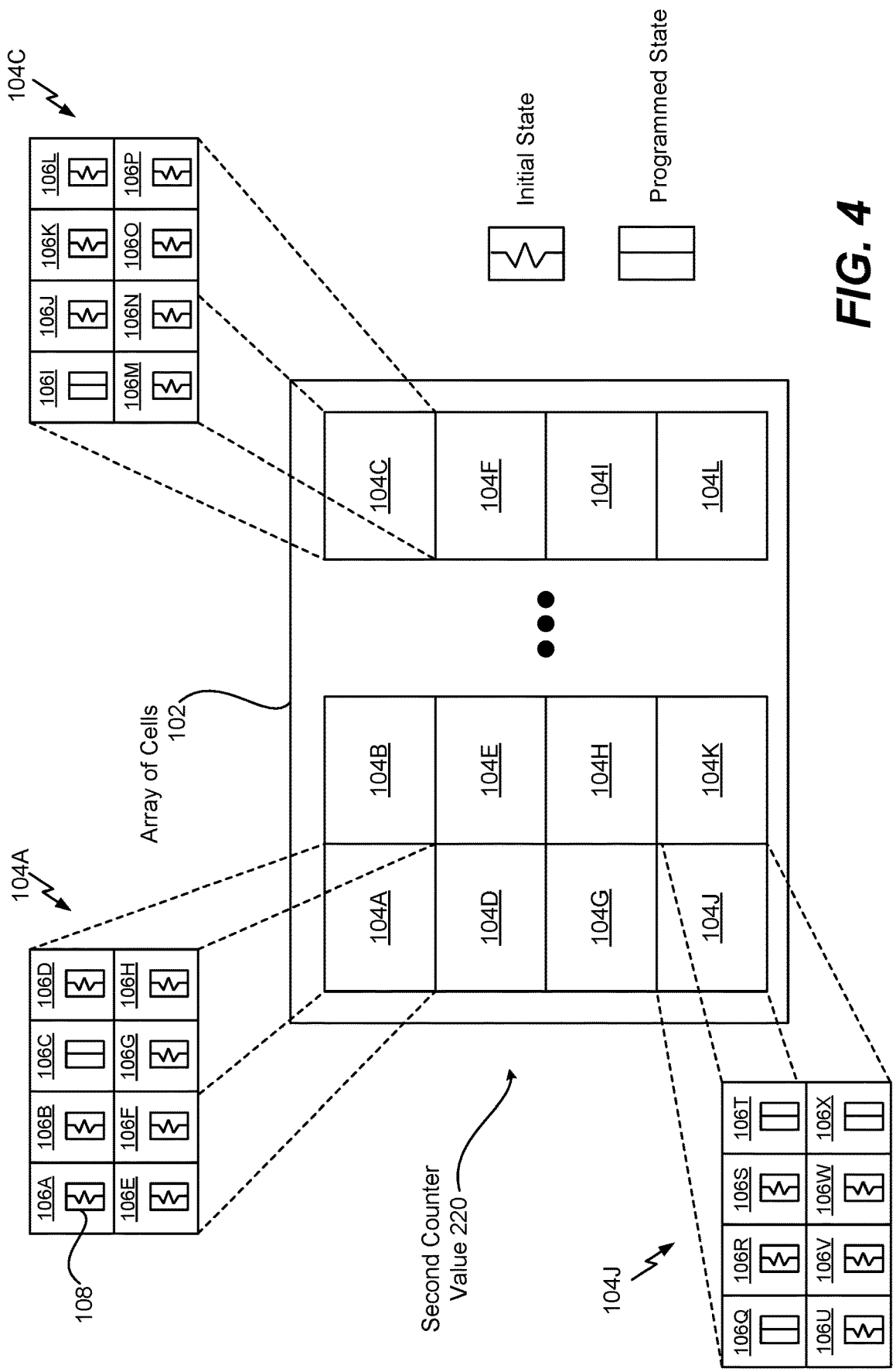
FIG. 4 is a diagram of the array of cells in a programmable state representative of a second valid counter value.

FIG. 4 is a diagram of the array of cells 102 in a programmable state representative of a second valid counter value. For example, in FIG. 4, the cells 106C, 106T, 106Q, 106I, 106X have the programmed state and the remaining cells 106 have the initial state. Based on the pseudorandom sequence of numbers 160 and the corresponding cell addresses, the programmable state of the array of cells 102 illustrated in FIG. 4 is representative of the second counter value 220.

To program the array of cells 102 to represent the second counter value 220, the program unit 126 identifies the last particular number in the sequence of numbers 160 that corresponds to a cell 106 in the programmed state. For example, the program unit 126 identifies the number "1" as the last particular number that corresponds to a cell 160 (e.g., the cell 106Q) in the programmed state for the first counter value 210. The program unit 126 also determines the number of cells 106 to be programmed for the second counter value 220 (e.g., the next counter value). For example, the program unit 126 determines, based on the secret cryptographic key 202, that the number of additional cells 106 to be programmed for the second counter value 220 is two.

The program unit 126 identifies the set of numbers in the sequence of numbers 160 corresponding to the second counter value 220. The size of the set of numbers is equal to the number of cells 106 to be programmed for the next counter value. For example, in the given example, the size of the set of numbers corresponding to the second counter value 220 is two. Thus, the program unit 126 identifies the next two numbers (e.g., "19" and "25") as the set of numbers corresponding to the second counter value 220. The first number (e.g., "19") in the set of numbers sequentially follows the last particular number (e.g., "1") that corresponds to a cell 106 in the programmed state.

The program unit 126 programs the set of cells 106 (that corresponds to the set of numbers) in the array of cells 102 from the initial state to the programmed state. For example, the program unit 126 sends a write voltage to program the programmable elements 108 of the cells 106I, 106X to the programmable state. As a result, the voltage levels across the cells 106I, 106X reduces such that the cells 106I, 106X have a bit value equal to zero. Thus, as illustrated in FIG. 4, the cells 106C, 106T, 106Q, 106I, 106X have the programmed state and the remaining cells 106 have the initial state. As a result, FIG. 4 illustrates the array of cells 102 in a programmable state representative of the second counter value 220.

The techniques described with respect to FIGS. 3-4 improve security by reducing the likelihood of success of an external reset attack on the array of cells 102. For example, instead of programming the cells 106 in sequential order (e.g., programming the cell 106A, followed by the cell 106B, etc.) to indicate an increase in counter value, the cells 106 are programmed in a pseudo-random order (e.g., programming the cell 106C, followed by the cell 106T, etc.) that is determined based on the secret cryptographic key 202. Thus, an attacker attempting to reset the array of cells 102 to access data associated with a previous counter value must know the pseudo-random order of the sequence of numbers 160 and know the relationship between each number in the sequence of numbers 160 and the addresses of the cells 106. As an added layer of security, each counter value is associated with a random number of cells 106. For example, three cells 106C, 106T, 106Q are programmed to indicate the first counter value 210, two additional cells 106I, 106X are programmed to indicate the second counter value 220, etc. Thus, an attacker attempting to reset the array of cells 102 to access data associated with a previous counter value must also know how many cells 106 are programmed for a particular counter value, in addition to the pseudo-random location of the programmed cells 106.

Figure 5:
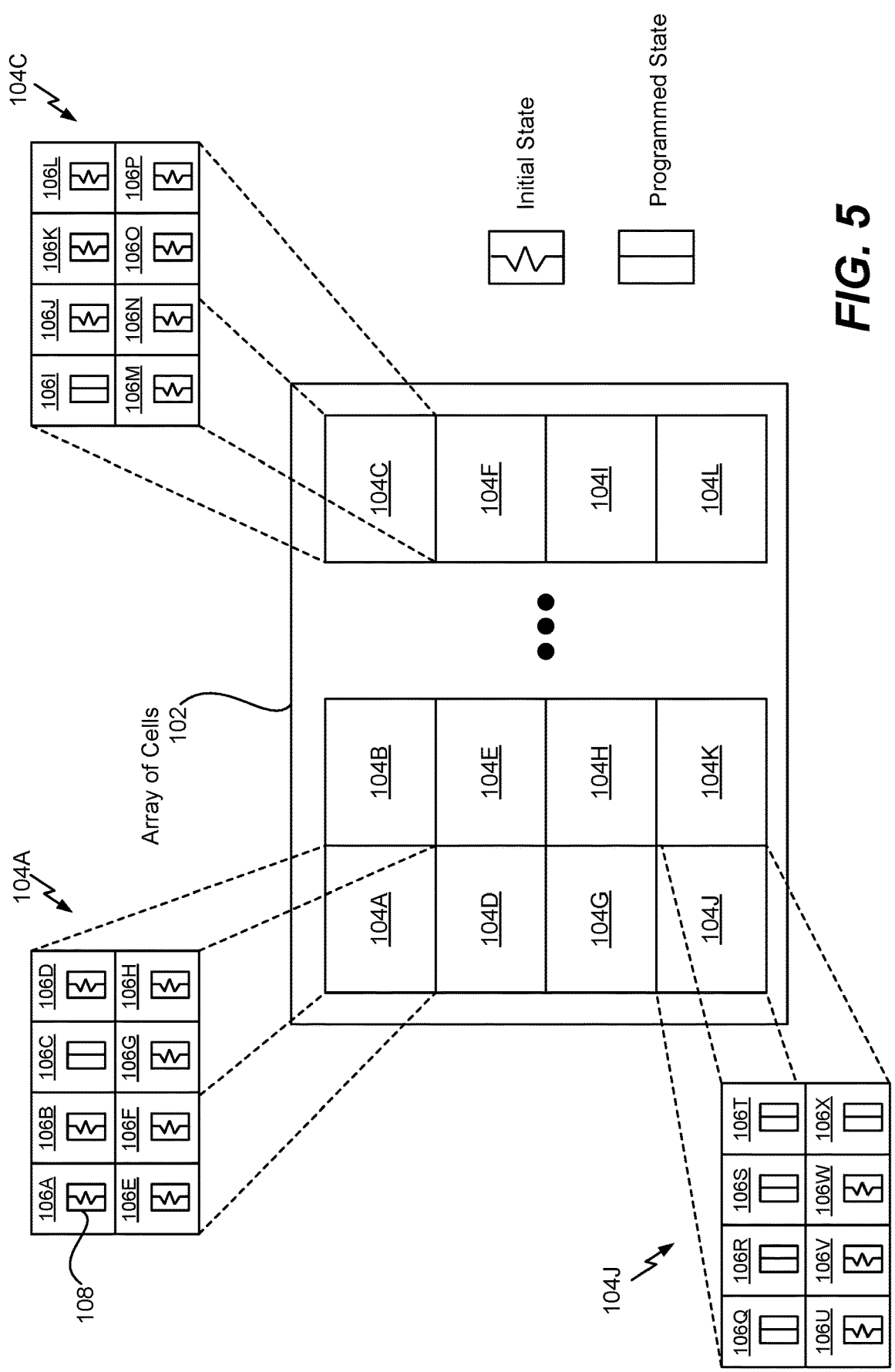
FIG. 5 is a diagram of the array of cells in a programmable state representative of an invalid counter value.

FIG. 5 is a diagram of the array of cells 102 in a programmable state representative of an invalid counter value. For example, in FIG. 5, the cells 106C, 106T, 106Q, 106I, 106X, 106R, 106S have the programmed state and the remaining cells 106 have the initial state. Based on the pseudorandom sequence of numbers 160 and the corresponding cell addresses, the programmable state of the array of cells 102 illustrated in FIG. 5 is not representative of a valid counter value.

For example, the event counter module 114 is configured to compare the addresses 162 of the cells 106C, 106T, 106Q, 106I, 106X, 106R, 106S having the programmed state to the addresses of programmed cells representative of a valid counter value. Because the addresses 162 of the cells 106C, 106T, 106Q, 106I, 106X, 106R, 106S having the programmed state do not match the addresses of programmed cells representative of a valid counter value, the event counter module 114 determines that the array of cells 102 illustrated in FIG. 5 is not representative of a valid counter value and a tampering event occurred. According to one implementation, the event counter module 114 can determine that the tampering event occurred because the cells 106R, 106S have the programmed state and cells (e.g., the cells 106A, 106L, 106J, 106U, 106D, 106K, 106P, 106H) corresponding to numbers (e.g., the numbers "13, 83, 51, 673, 1003, 12, 85, 43") in the sequence of numbers 160 that precede the numbers (e.g., the numbers "1215 and 245") associated with the cells 106R, 106S have the initial state.

The techniques described with respect to FIG. 5 for detecting an invalid counter value reduce the likelihood that straightforward techniques for resetting one-time programmable memory cells are successful. For example, if the cells 106 are programmed in sequential order, an attacker can target the array of cells 102 with a laser pulse to destroy a group of cells 106 and reset the counter value. However, because heating a die with a focused laser will likely destroy a large number of proximate cells 106 (e.g., destroy different sections 104 at a time), the bit patterns resulting from such an attack will likely indicate an invalid counter value. To illustrate, if a laser is applied to the cell 106R, it is likely that other cells (e.g., the cell 106S) in the section 104J will be affected because of the heat associated with the laser. As a result, the event counter module 114 can indicate that a tampering event (e.g., the applied laser) occurred because the cells 106 having a programmed state do not correspond to a valid counter value, and the countermeasure unit 124 can perform a countermeasure.

Figure 6:
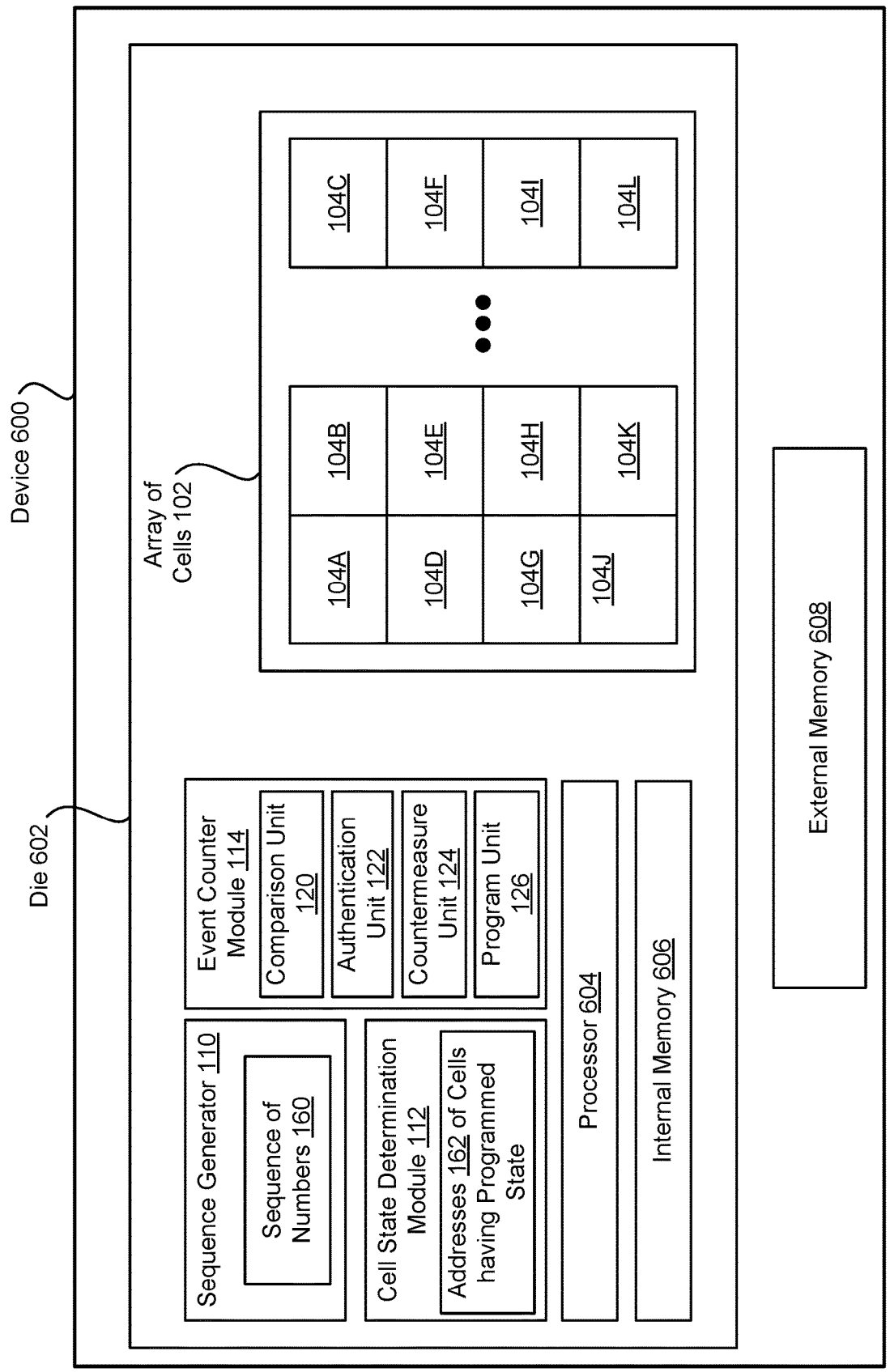
FIG. 6 is a diagram of another device that is operable to persistently store event counts for a particular event using one-time programmable memory cells.

FIG. 6 is a diagram of another device 600 that is operable to persistently store event counts for a particular event using one-time programmable memory cells. For example, in a similar manner as described with respect to the device 100 of FIG. 1, each time the particular event occurs, the device 600 is operable to update a counter value by changing a state of one or more one-time programmable memory cells to indicate that the particular event occurred.

The device 600 includes a die 602. The array of cells 102, the sequence generator 110, the cell state determination module 112, and the event counter module 114 are integrated on the die 602. Additionally, a processor 604 and an internal memory 606 are integrated on the die 602. The device 600 also includes an external memory 608.

If the event counter module 114 determines that a tampering event occurred, the countermeasure unit 124 can perform one or more countermeasures. As a non-limiting example, the countermeasure unit 124 can delete data from the external memory 608 in response to a determination that a tampering event occurred at the array of cells 102. As another non-limiting example, the countermeasure unit 124 can delete data from the internal memory 606 in response to a determination that a tampering event occurred at the array of cells 102. As another non-limiting example, the countermeasure unit 124 can restrict access to one or more operations of the processor 604.

Figure 7:
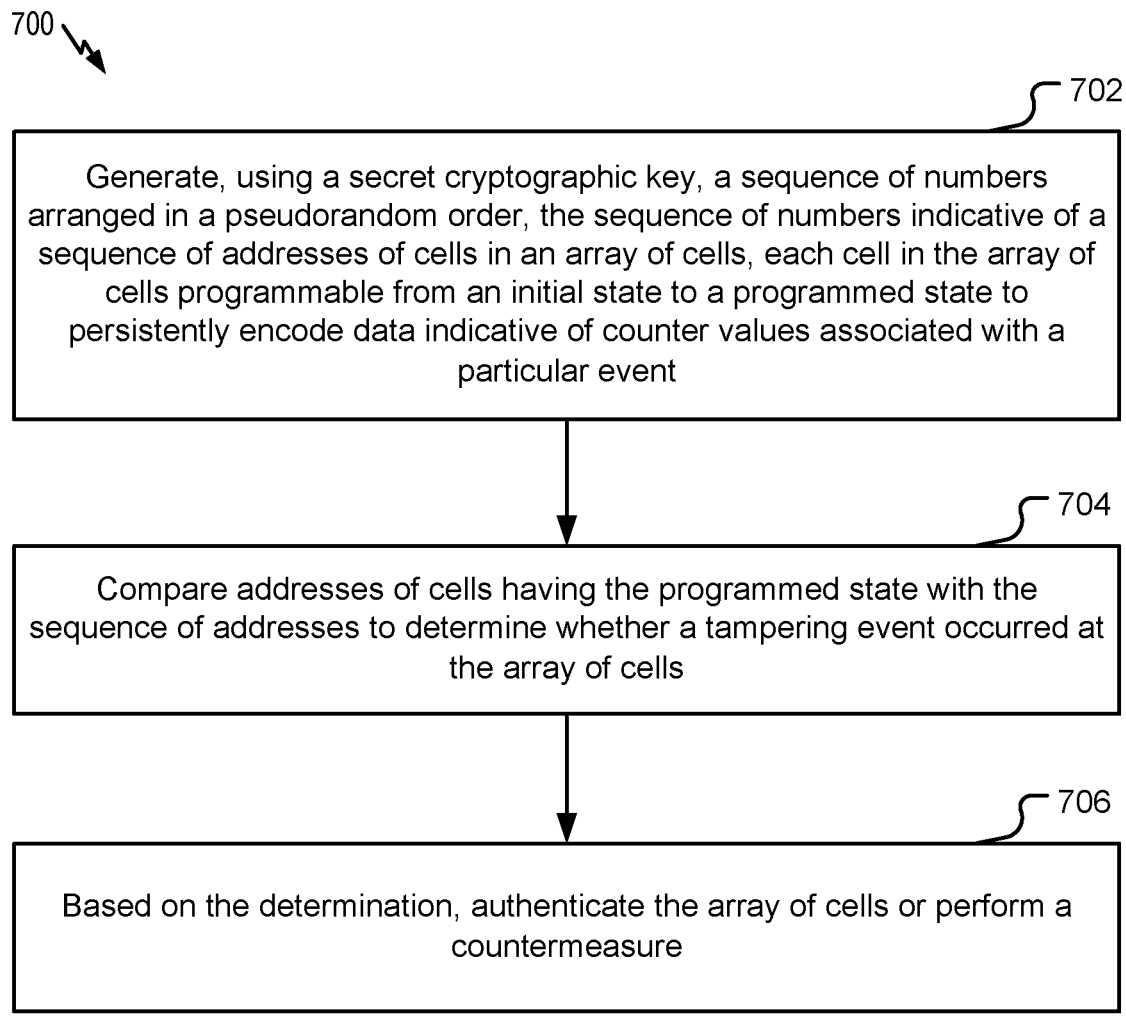
FIG. 7 is a flowchart of a method of persistently storing event counts for a particular event using one-time programmable memory cells.

FIG. 7 is a flowchart of a method 700 of persistently storing event counts for a particular event using one-time programmable memory cells. The method 700 may be performed by the device 100, the device 600, or both.

The method 700 includes generating, using a secret cryptographic key, a sequence of numbers arranged in a pseudorandom order, at 702. The sequence of numbers is indicative of a sequence of addresses of cells in an array of cells. Each cell in the array of cells is programmable from an initial state to a programmed state to persistently encode data indicative of counter values associated with a particular event. For example, the sequence generator 110 generates the sequence of numbers 160 (arranged in pseudorandom order) using the secret cryptographic key 202. The sequence of numbers 160 is indicative of the sequence of addresses of cells 106 in the array of cells 102. Each cell 106 in the array of cells 102 is programmable from the initial state to the programmed state to persistently encode data indicative of counter values.

The method 700 also includes comparing addresses of cells having the programmed state with the sequence of addresses to determine whether a tampering event occurred at the array of cells, at 704. For example, the comparison unit 120 compares addresses of cells 160 having the programmed state with the sequence of addresses to determine whether the tampering event occurred at the array of cells.

According to one implementation, the method 700 includes determining that the tampering event failed to occur in response to a determination that the addresses of cells having the programmed state correspond to a valid counter value indicated by the sequence of addresses. For example, the event counter module 114 can determine that the tampering event failed to occur if the array of cells 102 has the programmable state indicated by FIG. 3 or the programmable state indicated by FIG. 4. The programmable state indicated by FIG. 3 corresponds to the first counter value 210 (e.g., a valid counter value), and the programmable state indicated by FIG. 4 corresponds to the second counter value 220 (e.g., a valid counter value). The first counter value 210 is represented by a first set of programmed cells 106C, 106T, 106Q, and the second counter value 220 is represented by a second set of programmed cells 106C, 106T, 106Q, 106I, 106X that includes the first set of programmed cells 106C, 106T, 106Q.

According to one implementation, the method 700 includes determining that the tampering event occurred in response to a determination that the addresses of cells having the programmed state fail to correspond to a valid counter value indicated by the sequence of addresses. For example, the event counter module 114 can determine that the tampering event occurred if the array of cells 102 has the programmable state indicated by FIG. 5.

According to one implementation, the method 700 includes determining that the tampering event occurred in response to a determination that a first particular cell corresponding to a first particular number in the sequence of numbers is in the initial state and a second particular cell corresponding to a second particular number in the sequence of numbers is in the programmed state. In this implementation, the second particular number follows the first particular number in the sequence of numbers. For example, the event counter module 114 may determine that the tampering event occurred in response to a determination that the cell 106C is in the initial state and the cell 106I is in the programmed state. For example, because the cell 106I corresponds to a number (e.g., "19") in the sequence of numbers 160 that follows the number (e.g., "14") corresponding to the cell 106C, the event counter module 114 can determine that the tampering event occurred because the cell 106I was programmed before the cell 106C.

According to one implementation, in response to a determination that the tampering event failed to occur, the method 700 includes identifying, in the sequence of numbers, a last particular number that corresponds to a cell in the programmed state. The last particular number is associated with a current counter value. For example, if the first counter value 210 is the current counter value, the program unit 126 identified the last particular number (e.g., "1") that corresponds to a cell (e.g., the cell 106Q) in the programmed state. The method 700 also includes determining a number of cells to be programmed for a next counter value. For example, the program unit 126 determines that two additional cells are to be programmed to encode the second counter value 220. The method 700 also includes identifying particular numbers, in the sequence of numbers, that sequentially follow the last particular number. The particular numbers are indicative of the addresses of cells to be programmed for the next counter value. For example, the program unit 126 identifies the numbers (e.g., "19" and "25") that sequentially follow the last particular number (e.g., "1") in the sequence of numbers 160. A quantity of the particular numbers is equal to the determined number of cells to be programmed. The method 700 also includes programming at least one particular cell in the array of cells from the initial state to the programmed state. For example, the program unit 126 programs the cells 106I, 106X from the initial state to the programmed state.

According to one implementation, in response to a determination that the tampering event failed to occur, the method 700 includes identifying, in the sequence of numbers, a last particular number that corresponds to a cell in the programmed state. The last particular number is associated with a current counter value. For example, if the first counter value 210 is the current counter value, the program unit 126 identified the last particular number (e.g., "1") that corresponds to a cell (e.g., the cell 106Q) in the programmed state. The method 700 also includes determining a number of cells to be programmed for a next counter value. For example, the program unit 126 determines that two additional cells are to be programmed to encode the second counter value 220. The number of additional cells to be programmed is pseudo-random and dependent on the secret cryptographic key 202. The method 700 also includes identifying a set of numbers in the sequence of numbers that correspond to the next counter value. The first number in the set of numbers sequentially follows the last particular number, and the set of numbers include sequential numbers in the sequence of numbers. For example, the program unit 126 identifies the set of numbers (e.g., "19" and "25") that correspond to the second counter value 220. The method 700 also includes programming a set of cells in the array of cells from the initial state to the programmed state. Each number in the set of numbers is indicative of a corresponding cell in the set of cells. For example, the program unit 126 programs the cells 106I, 106X from the initial state to the programmed state. According to one implementation, a size of the set of numbers is encoded into the sequence of numbers 160 or a second sequence of numbers. The size of the set of numbers is pseudorandom and has a value of one, two, three, or four.

The method 700 also includes, based on the determination, authenticating the array of cells or performing a countermeasure, at 706. For example, the authentication unit 122 authenticates the array of cells 102 if the event counter module 114 determines that the tampering event did not occur, and the countermeasure unit 124 performs a countermeasure if the event counter module 114 determines that the tampering event occurred. According to one implementation, performing the countermeasure includes at least one of deleting data from the external memory 608, deleting data from the internal memory 606, or restricting access to one or more operations of the processor 604.

The method 700 improves security of a counter value by reducing the likelihood that the array of cells 102 is subject to an external reset attack. For example, instead of programming the cells 106 in sequential order to indicate an increase in counter value, the cells 106 are programmed in a pseudo-random order that is determined based on the secret cryptographic key 202. Thus, an attacker attempting to reset the array of cells 102 to access data associated with a previous counter value must know the pseudo-random order of the sequence of numbers 160 and know the relationship between each number in the sequence of numbers 160 and the addresses of the cells 106. As an added layer of security, each counter value is associated with a random number of cells 106. For example, three cells 106C, 106T, 106Q are programmed to indicate the first counter value 210, two additional cells 106I, 106X are programmed to indicate the second counter value 220, etc. Thus, an attacker attempting to reset the array of cells 102 to access data associated with a previous counter value must also know how many cells 106 are programmed for a particular counter value, in addition to the pseudo-random location of the programmed cells 106.

Figure 8:
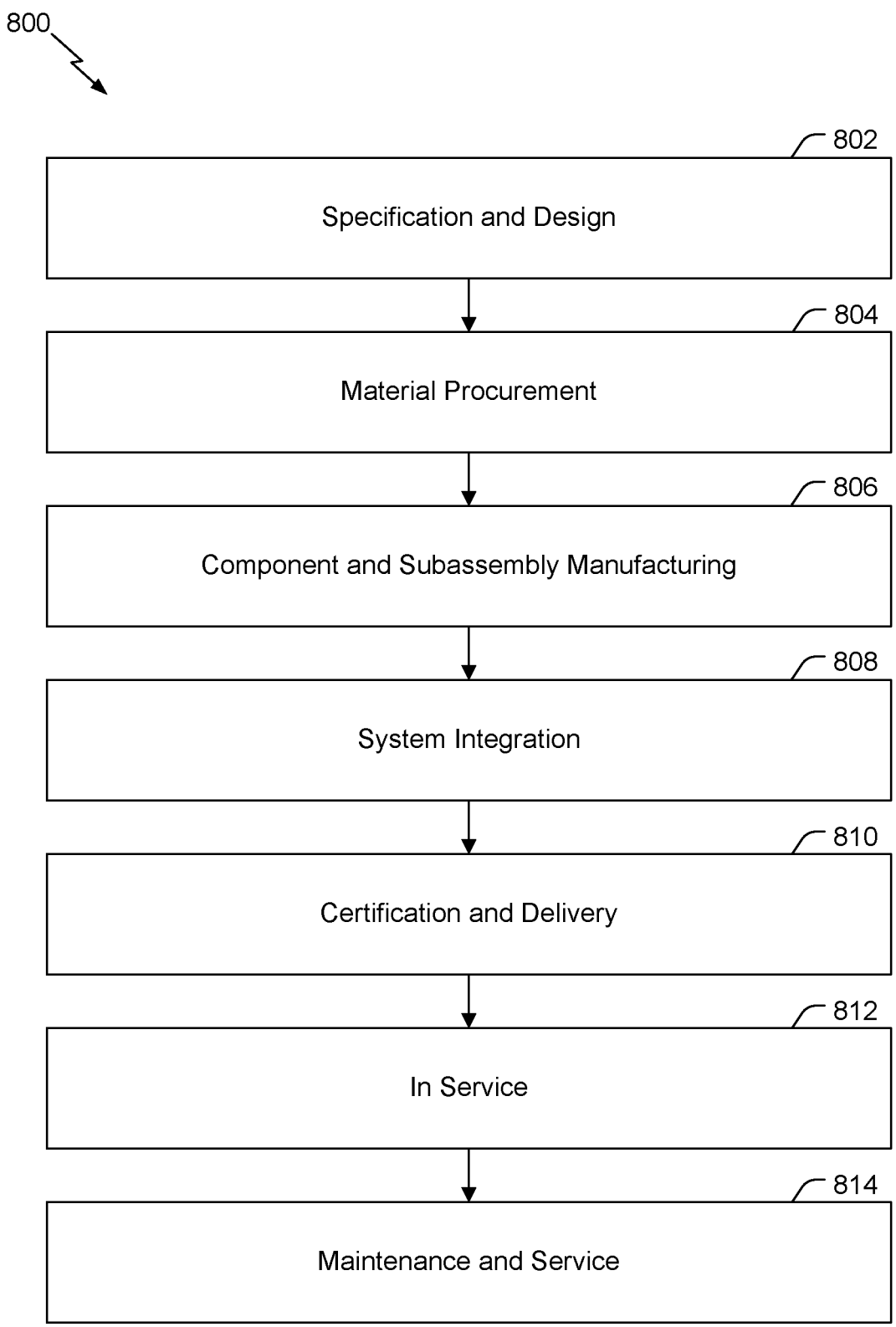
FIG. 8 is a flowchart of a method associated with the development and maintenance of a device that is operable to persistently store event counts for a particular event using one-time programmable memory cells.
Figure 9:
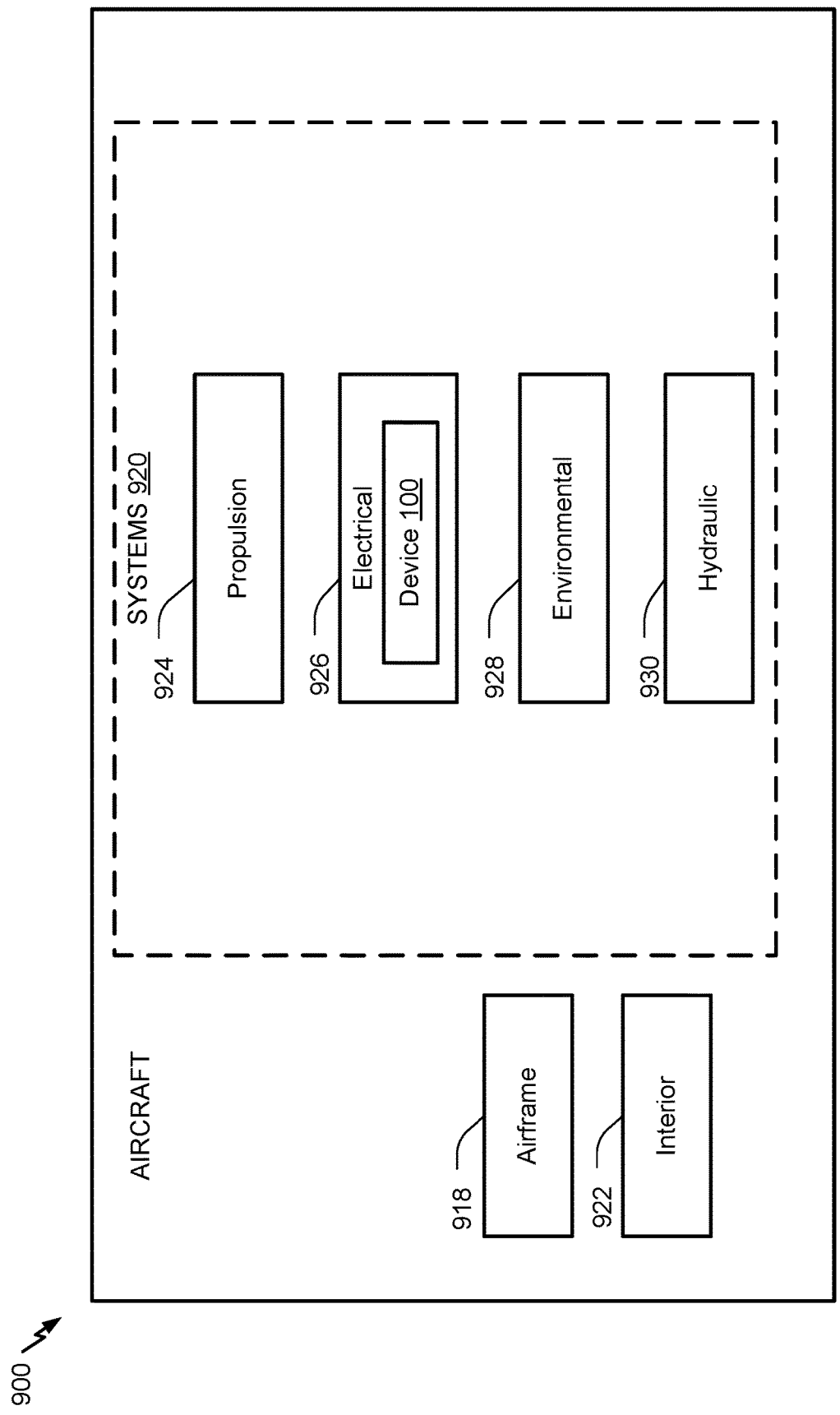
FIG. 9 is a block diagram of an aircraft including the device of FIG. 1.

Referring to FIGS. 8 and 9, examples of the disclosure are described in the context of an aircraft design, manufacturing, and service. FIG. 8 shows a flowchart illustrative of a method 800 associated with the device 100. During pre-production, the method 800 includes, at 802, specification and design of the device 100. At 804, the method 800 includes material procurement. For example, the method 800 includes procuring materials (such as materials for the device) for an aircraft.

During production, the method 800 includes, at 806, component and subassembly manufacturing and, at 808, system integration of the aircraft. The method 800 may include component and subassembly manufacturing of the device 100. At 810, the method 800 includes certification and delivery of the aircraft and, at 812, placing the aircraft in service. In some implementations, certification and delivery includes certifying the device 100. Placing the aircraft in service may also include placing the device 100 in service. While in service, the aircraft may be scheduled for routine maintenance and service (which may also include modification, reconfiguration, refurbishment, and so on). At 814, the method 800 includes performing maintenance and service on the aircraft.

FIG. 9 is a block diagram of an illustrative implementation of an aircraft 900 that includes the device 100. In at least one implementation, the aircraft 900 is produced by at least a portion of the method 800 of FIG. 8. As shown in FIG. 9, the aircraft 900 includes an airframe 918, a plurality of systems 920, and an interior 922. Examples of the plurality of systems 920 include one or more of a propulsion system 924, an electrical system 926, an environmental system 928, and a hydraulic system 930. The electrical system 926 includes the device 100. Any number of other systems may be included in the aircraft 900. Although an aerospace example is shown, the present disclosure may be applied to other industries. For example, the device 100 can be used onboard another manned or unmanned vehicle (such as an automobile, a satellite, a watercraft, or a land-based vehicle).

Apparatus and methods included herein may be employed during any one or more of the stages of the method 800 of FIG. 8. For example, components or subassemblies corresponding to production process 808 can be fabricated or manufactured in a manner similar to components or subassemblies produced while the aircraft 900 is in service, at 812 for example and without limitation. Also, one or more apparatus implementations, method implementations, or a combination thereof may be utilized during the production stages (e.g., stages 802-810 of the method 800), for example, by substantially expediting assembly of or reducing the cost of the aircraft 900. Similarly, one or more of apparatus implementations, method implementations, or a combination thereof may be utilized while the aircraft 900 is in service, for example and without limitation, to maintenance and service, at 814.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for persistently storing event counts, the device comprising:
    an array of cells, each cell in the array of cells configured to be programmed from an initial state to a programmed state to persistently encode data indicative of counter values associated with a particular event;
    a sequence generator configured to generate, using a secret cryptographic key, a sequence of numbers arranged in a pseudorandom order, the sequence of numbers indicative of a sequence of addresses of cells in the array of cells; and
    an event counter module configured to:
        compare addresses of cells having the programmed state with the sequence of addresses to determine whether a tampering event occurred at the array of cells based on an order of addresses in the sequence of addresses, wherein the event counter module is configured to determine that the tampering event did not occur in response to a determination that the addresses of cells having the programmed state correspond to a valid counter value indicated by the sequence of addresses, wherein a first valid counter value corresponding to the sequence of addresses is represented by a first set of programmed cells, wherein a second valid counter value corresponding to the sequence of addresses is represented by a second set of programmed cells, wherein the second set of programmed cells includes the first set of programmed cells and a particular set of cells, and wherein the first set of programmed cells does not include the particular set of cells;
        based on the determination, authenticate the array of cells or perform a countermeasure; and
        responsive to an occurrence of the particular event and authentication of the array of cells as corresponding to the first valid counter value, program the particular set of cells in the array of cells from the initial state to the programmed state, wherein the particular set of cells is identified based on the order of addresses in the sequence of addresses.

2. The device of claim 1, wherein a third valid counter value corresponding to the sequence of addresses is represented by a third set of programmed cells, wherein the third set of programmed cells includes the second set of programmed cells and a second particular set of cells, wherein the second particular set of cells is identified based on the order of addresses in the sequence of addresses, and wherein the event counter is configured to, responsive to a second occurrence of the particular event and authentication of the array of cells as corresponding to the second valid counter value, program the second particular set of cells in the array of cells from the initial state to the programmed state.

3. The device of claim 1, wherein the particular set of cells includes at least one cell that has a first particular memory address that is before a second particular memory address of at least one cell of the first set of programmed cells, and wherein a first plurality of memory addresses of the particular set of cells is subsequent to a second plurality of memory addresses of the first set of programmed cells in the sequence of addresses.

4. The device of claim 1, wherein the event counter module is configured to determine that the tampering event occurred in response to a determination that:
    a first particular cell corresponding to a first particular number in the sequence of numbers is in the initial state; and a second particular cell corresponding to a second particular number in the sequence of numbers is in the programmed state, the second particular number following the first particular number in the sequence of numbers.

5. The device of claim 1, wherein each cell in the array of cells comprises a one-time programmable memory cell.

6. The device of claim 1, wherein, in response to a determination that the tampering event failed to occur, the event counter module is further configured to:
identify, in the sequence of numbers, a last particular number that corresponds to a cell in the programmed state, the last particular number associated with a current counter value;
determine a number of cells to be programmed for a next counter value; and
identify particular numbers, in the sequence of numbers, that sequentially follow the last particular number, wherein a quantity of the particular numbers is equal to the number of cells to be programed, wherein the particular numbers correspond to the particular set of cells.

7. The device of claim 1, wherein, in response to a determination that the tampering event failed to occur, the event counter module is further configured to:
identify, in the sequence of numbers, a last particular number that corresponds to a cell in the programmed state, the last particular number associated with a current counter value;
determine a number of cells to be programmed for a next counter value, wherein the number of cells is pseudorandom and dependent on the secret cryptographic key; and
identify a set of numbers in the sequence of numbers corresponding to the next counter value, a first number in the set of numbers sequentially following the last particular number, and the set of numbers comprising sequential numbers in the sequence of numbers, wherein the set of numbers corresponds to the particular set of cells.

8. The device of claim 7, wherein a size of the set of numbers is encoded into the sequence of numbers or a second sequence of numbers.

9. The device of claim 8, wherein the size is pseudorandom and has a value of one, two, three, or four.

10. The device of claim 1, wherein the particular event is associated with at least one of powering on a flight computer or booting the flight computer.

11. The device of claim 1, wherein the particular event is associated with an automotive security system.

12. The device of claim 1, wherein the array of cells, the sequence generator, and the event counter module are integrated on a die, the die further comprising a processor, and wherein the countermeasure comprises at least one of deleting data from an external memory, deleting data from an internal memory, or restricting access to one or more operations of the processor.

13. A method of persistently storing event counts, the method comprising:
generating, using a secret cryptographic key, a sequence of numbers arranged in a pseudorandom order, the sequence of numbers indicative of a sequence of addresses of cells in an array of cells, each cell in the array of cells programmable from an initial state to a programmed state to persistently encode data indicative of counter values associated with a particular event;
comparing addresses of cells having the programmed state with the sequence of addresses to determine whether a tampering event occurred at the array of cells based on an order of addresses in the sequence of addresses,. wherein the tampering event is determined to have not occurred in response to a determination that the addresses of cells having the programmed state correspond to a valid counter value indicated by the sequence of addresses, wherein a first valid counter value corresponding to the sequence of addresses is represented by a first set of programmed cells, wherein a second valid counter value corresponding to the sequence of addresses is represented by a second set of programmed cells, wherein the second set of programmed cells includes the first set of programmed cells and a particular set of cells, and wherein the first set of programmed cells does not include the particular set of cells;
based on the determination:
authenticating the array of cells; or
performing a countermeasure; and
responsive to an occurrence of the particular event and authentication of the array of cells as corresponding to the first valid counter value, programming the particular set of cells in the array of cells from the initial state to the programmed state, wherein the particular set of cells is identified based on the order of addresses in the sequence of addresses.

14. The method of claim 13, wherein a third valid counter value corresponding to the sequence of addresses is represented by a third set of programmed cells, wherein the third set of programmed cells includes the second set of programmed cells and a second particular set of cells, wherein the second particular set of cells is identified based on the order of addresses in the sequence of addresses, and further comprising responsive to a second occurrence of the particular event and authentication of the array of cells as corresponding to the second valid counter value, programming the second particular set of cells in the array of cells from the initial state to the programmed state.

15. The method of claim 13, wherein the particular set of cells includes at least one cell that has a first particular memory address that is before a second particular memory address of at least one cell of the first set of programmed cells, and wherein a first plurality of memory addresses of the particular set of cells is subsequent to a second plurality of memory addresses of the first set of programmed cells in the sequence of addresses.

16. The method of claim 13, wherein each cell in the array of cells comprises a one-time programmable memory cell.

17. The method of claim 13, further comprising, in response to determining that the tampering event failed to occur:
identifying, in the sequence of numbers, a last particular number that corresponds to a cell in the programmed state, the last particular number associated with a current counter value;
determining a number of cells to be programmed for a next counter value; and
identifying particular numbers, in the sequence of numbers, that sequentially follow the last particular number, wherein a quantity of the particular numbers is equal to the number of cells to be programed, and wherein the particular numbers correspond to the particular set of cells.

18. The method of claim 13, wherein the particular event is associated with at least one of powering on a flight computer or booting the flight computer.

19. The method of claim 13, wherein performing the countermeasure comprises at least one of deleting data from an external memory, deleting data from an internal memory, or restricting access to one or more operations of a processor.

20. A device for persistently storing event counts, the device comprising:
- an array of cells, each cell in the array of cells configured to be programmed from an initial state to a programmed state to persistently encode data indicative of counter values associated with a particular event;
- means for generating, using a secret cryptographic key, a sequence of numbers arranged in a pseudorandom order, the sequence of numbers indicative of a sequence of addresses of cells in the array of cells;
- means for comparing addresses of cells having the programmed state with the sequence of addresses to determine whether a tampering event occurred at the array of cells based on an order of addresses in the sequence of addresses, wherein the tampering event is determined to have not occurred in response to a determination that the addresses of cells having the programmed state correspond to a valid memory value indicated by the sequence of addresses, wherein a first valid memory value corresponding to the sequence of addresses is represented by a first set of programmed cells, wherein a second valid memory value corresponding to the sequence of addresses is represented by a second set of programmed cells, wherein the second set of programmed cells includes the first set of programmed cells and a particular set of cells, and wherein the first set of programmed cells does not include the particular set of cells;
- means for authenticating the array of cells based on the determination;
- means for performing a countermeasure based on the determination; and
- means for programming, responsive to an occurrence of the particular event and authentication of the array of cells as corresponding to the first valid memory value, the particular set of cells in the array of cells from the initial state to the programmed state, wherein the particular set of cells is identified based on the order of addresses in the sequence of addresses.

* * * * *